(12) United States Patent
Clemm et al.

(10) Patent No.: US 7,792,036 B2
(45) Date of Patent: Sep. 7, 2010

(54) EVENT PROCESSING IN RATE LIMITED NETWORK DEVICES

(75) Inventors: L. Alexander Clemm, Los Gatos, CA (US); Petre Dini, San Jose, CA (US); Cosmin Dini, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 429 days.

(21) Appl. No.: 11/657,193

(22) Filed: Jan. 23, 2007

(65) Prior Publication Data

US 2008/0175145 A1    Jul. 24, 2008

(51) Int. Cl.
*H04J 1/16* (2006.01)
*H04J 3/16* (2006.01)

(52) U.S. Cl. .................. 370/235; 370/236; 370/465

(58) Field of Classification Search ............... 370/230, 370/235, 236, 465
See application file for complete search history.

(56) References Cited

U.S. PATENT DOCUMENTS

| | | | |
|---|---|---|---|
| 5,500,855 A | | 3/1996 | Hershey |
| 5,949,759 A | | 9/1999 | Cretegny |
| 6,005,843 A | * | 12/1999 | Kamiya .................. 370/236.1 |
| 6,058,420 A | | 5/2000 | Davies |
| 6,256,670 B1 | | 7/2001 | Davies |
| 6,539,428 B2 | | 3/2003 | Davies |
| 6,570,848 B1 | * | 5/2003 | Loughran et al. ........ 370/230.1 |
| 6,597,957 B1 | | 7/2003 | Beakley |
| 6,625,680 B1 | | 9/2003 | Fronberg |
| 6,694,364 B1 | | 2/2004 | Du |
| 6,748,432 B1 | | 6/2004 | Du |
| 6,810,016 B1 | | 10/2004 | Sun |
| 6,862,698 B1 | | 3/2005 | Shyu |
| 6,985,920 B2 | | 1/2006 | Bhattacharya |
| 7,047,298 B2 | | 5/2006 | Davies |
| 7,084,752 B2 | | 8/2006 | Parello |
| 7,111,091 B2 | * | 9/2006 | Lakaniemi et al. ............ 710/52 |
| 7,158,480 B1 | * | 1/2007 | Firoiu et al. ................ 370/235 |
| 7,369,498 B1 | * | 5/2008 | Ma et al. .................... 370/235 |
| 2004/0093440 A1 | * | 5/2004 | Lakaniemi et al. ............ 710/29 |
| 2005/0036445 A1 | * | 2/2005 | Chien-Hsin ................ 370/229 |
| 2007/0014352 A1 | * | 1/2007 | Wu et al. ............... 375/240.07 |
| 2007/0153686 A1 | * | 7/2007 | Xiang ........................ 370/229 |

OTHER PUBLICATIONS

F. Miao et al., "TLS Transport Mapping for SYSLOG," IETF Internet-Draft "draft-ietf-syslog-transport-tls-03.txt," published by the Internet Engineering Task Force of The Internet Society, Aug. 27, 2006, 12 pages.

* cited by examiner

*Primary Examiner*—Andrew Lee
(74) *Attorney, Agent, or Firm*—Hickman Palermo Truong & Becker LLP

(57) ABSTRACT

Event processing in rate limited network devices is described. An event receiver is notified of a backlog condition and may respond by increasing the rate limit for the network device. If an event queue on the network device overflows, event messages may be diverted to an event message overflow store or to a network location. Later, the messages may be retrieved after the overflow condition has cleared. As a result, critical messages or events such as Syslog messages are not lost when a rate limited network device cannot deliver the messages to a network management station.

25 Claims, 5 Drawing Sheets

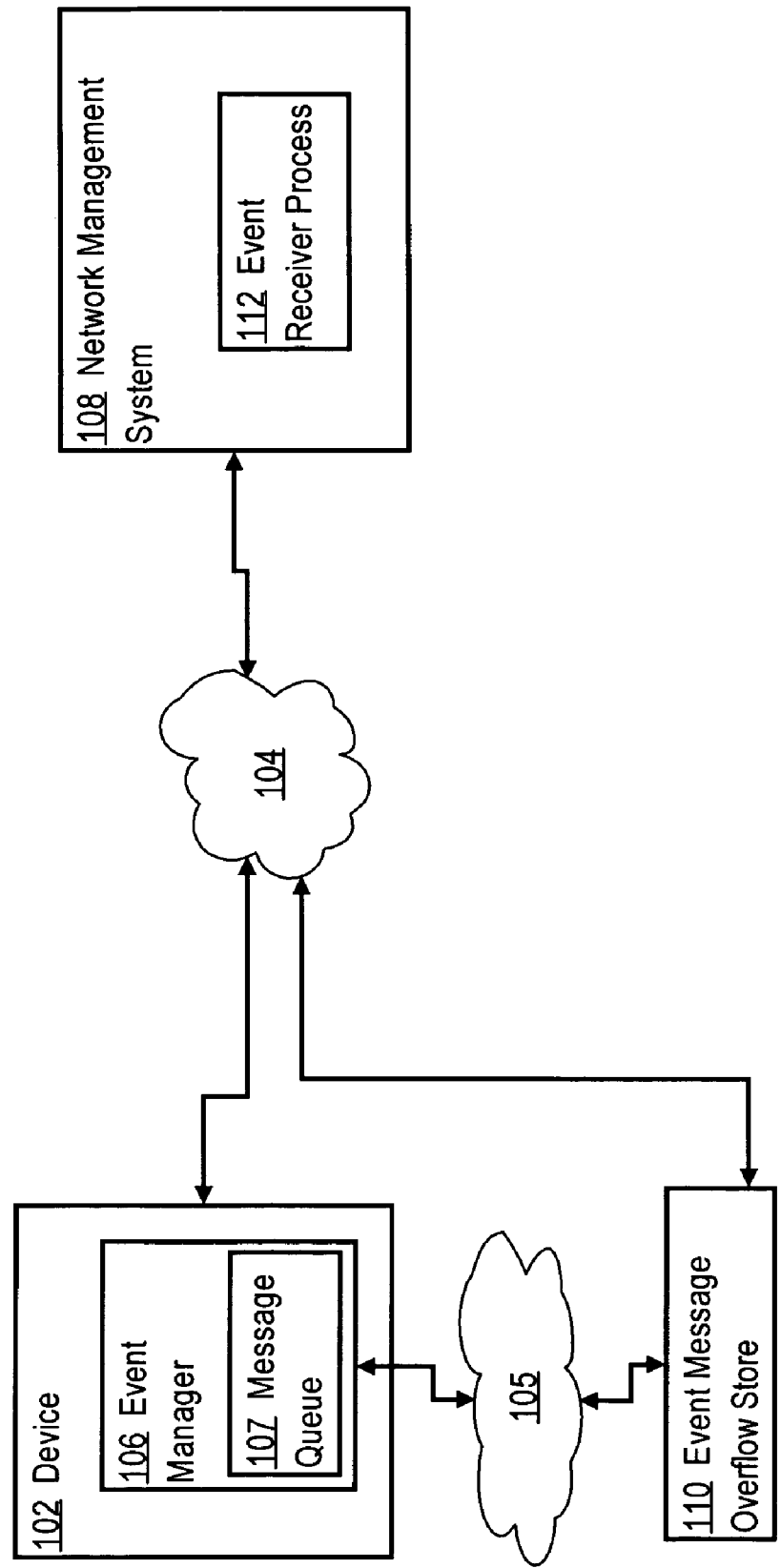

MESSAGE RECEIVER

MESSAGE SENDER

US 7,792,036 B2

EVENT PROCESSING IN RATE LIMITED NETWORK DEVICES

FIELD OF THE INVENTION

The present disclosure generally relates to network management and event reporting.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Event messages sent by network devices are an important source of information for management systems, including network monitoring applications. The messages allow for event-driven management, which is notifying management applications of occurrences in the network so that the application can then react to in a timely fashion. Syslog messages are an important category of such event messages.

In some cases, the rate at which events can be emitted by a device may be constrained. The actual rate at which event messages are generated within the device may at times be significantly higher that the rate at which the messages may be sent; for example, in the case of high-density devices and/or in the case of outages that result in message storms. This could lead to a situation in which a large backlog of messages builds up inside the device. A large backlog of messages inside a device creates significant problems. For example, if the backlog causes the message buffer in the device to overflow, messages will be dropped. In the case of Syslog messages, the logger queue may become overloaded, resulting in dropped messages.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates an IP network on which a device and NMS are located;

DESCRIPTION OF EXAMPLE EMBODIMENTS

Figure 2B:
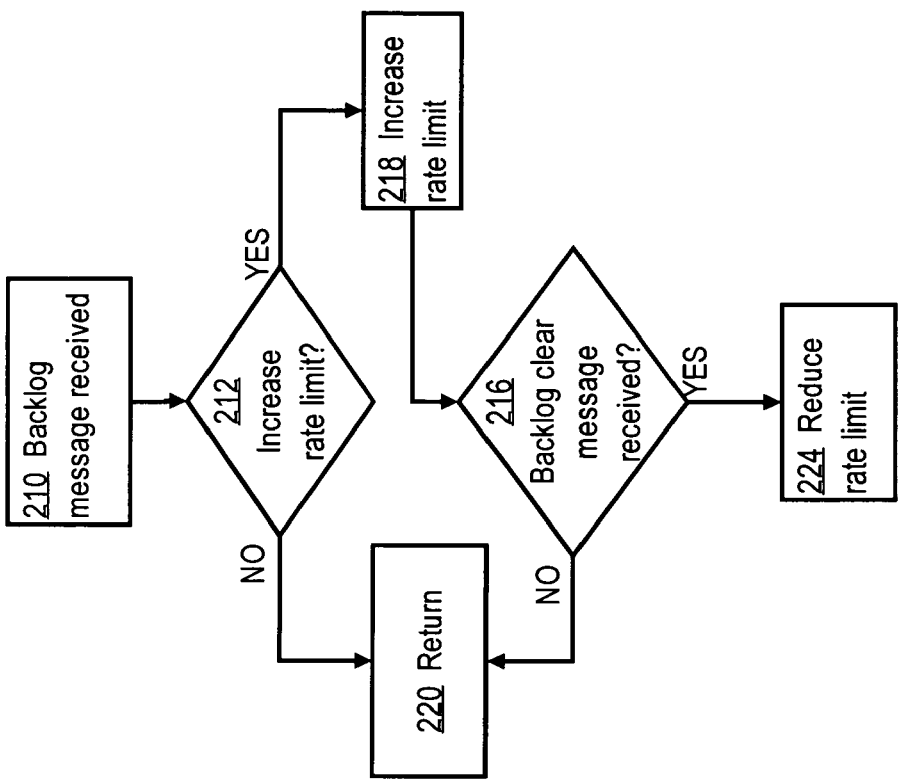
FIG. 2B illustrates an example of a message receiver managing an event message backlog.

Event processing in rate limited network devices is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method and Apparatus for Classifying Data Packet Protocol Values
4.0 Implementation Mechanisms—Hardware Overview
5.0 Extensions and Alternatives 1.0 General Overview Event processing in rate limited network devices is described. An event receiver is notified of a backlog condition and may respond by increasing the rate limit for the network device. If an event queue on the network device overflows, event messages may be diverted to an event message overflow store or to a network location. Later, the messages may be retrieved after the overflow condition has cleared. As a result, critical messages or events such as Syslog messages are not lost when a rate limited network device cannot deliver the messages to a network management station. Thus, the present disclosure relates to techniques for addressing event backlogs and overflows at a managed device.

The needs identified in the foregoing Background, and other needs and objects that will become apparent from the following description, are achieved in the present invention, which comprises, in one embodiment, an apparatus providing event processing in rate limited network devices. An event receiver is notified of an event backlog condition. In response to the notification, the event receiver may increase a rate limit imposed at the managed device. Another stage may be activated in case the event queue threatens to overflow, and comprises diverting event messages to a location from which the messages may be retrieved in the future. The apparatus may comprise a processor configured to execute instructions that identify an event message backlog and respond according to the technique described herein.

In an embodiment, the approaches described herein reduce and potentially eliminate the likelihood of event messages in rate-limited devices being lost due to overflow and the connectionless nature of UDP Syslog messages. In an embodiment, the approaches described herein use resources efficiently because additional event holding capacity is activated only when necessary. In an embodiment, the approaches described herein contribute to reliability and high availability and make event receivers aware of event storm situations and allow event receivers to react appropriately and implement policies to deal with the condition existing at the source of the events.

In other embodiments, a computer apparatus and a computer-readable medium configured to carry out the foregoing steps are provided.

2.0 Structural and Functional Overview

Internet Protocol (IP) networks may be comprised of several devices, such as routers, switches, servers, gateways and network management stations (NMS). Devices on the network may need to communicate status information with other devices. For example, these messages are often sent from a device to a NMS to indicate that an event has occurred at the device, so the NMS may respond accordingly.

Syslog is a protocol that allows a machine to send event notification messages across IP networks to event message collectors. In other words, a machine or device can be configured in such a way that it generates a Syslog Message and forwards it to a specific Syslog Daemon. This Syslog Daemon may be executing on a device or a NMS. Any process executing in a device may be capable of generating Syslog event messages.

Syslog messages are generally based on the User Datagram Protocol (UDP) type of IP communications, also some versions can run on other transport protocols. Syslog message text is generally no more than 1024 bytes in length. Since the UDP type of communication is connectionless, the sending or receiving host has no knowledge receipt for retransmission. If a UDP packet is lost due to congestion on the network or due to resource unavailability, the packet simply disappears.

In some cases, the rate at which events can be emitted by a device may be constrained. Rate constraints may occur for any number of reasons. For example, there may be management bandwidth limitations, such as a slow Wide Area Network (WAN) link. Further, rate throttling may be in effect in a device. Rate throttling imposes an artificial limit on the rate at which the device may send event messages in order to avoid flooding messages to the event message receivers.

The actual rate at which event messages are generated within the device may at times be significantly higher that the rate at which the messages may be sent. For example, high-density devices may generate high numbers of messages. Further, service outages can result in message storms. An example is voice gateway failures that lead to separate messages for each abnormally terminated call, which could lead to building a large backlog of messages in the device.

A large backlog of messages in a device creates significant problems. For example, the backlog may cause the message buffer in the device to overflow, causing messages to be dropped. In the case of Syslog messages, the logger queue may become overloaded, resulting in dropped messages. Further, a significant delay may be encountered from the onset of the condition that causes an event message to be generated to the time that the message describing the condition is actually received by a NMS. Such delay is a problem in the case of events that call for immediate management attention, because delays in taking management action to remedy the situation may cause services to be degraded and network and service availability to be negatively impacted.

Filtering and correlation approaches can be used for handling backlogs and overflows of messages inside a device. These approaches attempt to reduce the number of event notifications that are emitted by a device, thereby eliminating the backlog problem before it occurs. Another approach is event subscriptions, which allow different receivers to subscribe to different event messages. The receiver receives all event messages meeting the subscription criteria regardless of the rate or load at which events occur.

FIG. 1 illustrates a network 104 comprising a network device 102 and network management system (NMS) 108. In an embodiment, network 104 comprises an IP network, but other network protocols may be used in other embodiments. Network 104 may comprise a LAN, WAN, or internetwork. In an embodiment, network device 102 functions as an event generator and NMS 108 functions as an event consumer. In an embodiment, an event generator is configured to generate and transmit event messages according to the approach herein.

Device 102 hosts or executes one or more processes comprising an event manager 106. Event manager 106 may generate event messages conforming to the Syslog protocol or any other event protocol. In an embodiment, event manager 106 comprises a Syslog process and in alternative embodiments the event manager may comprise any other process executing in the device that is capable of generating event messages.

In an embodiment, event messages from event manager 106 are communicated over network 104 to an event receiver process 112 hosted in or executing on an event consumer device such as NMS 108. In other embodiments, the event receiver may comprise any device, such as an application server, an event logger, or an event bus, that can function to receive events.

In an embodiment, NMS 108 may impose rate limiting on the device 102 to prevent overload by directing the device to send messages at a slower rate than the messages are generated at the device or at a slower rate than the device is capable of sending. In an embodiment, NMS 108 classifies devices on the network 104, such as device 102, based on priority and imposes different rate limits on the devices based upon the device classification.

In an embodiment, multiple Syslog processes may execute on device 102, and each such process may be directed to a different event receiver or the same event receiver process 112. In an embodiment, Syslog messages with a high severity are not rate limited. For example, a NMS 108 may rate limit Syslog messages with a certain severity level, for example, 2-7, but not rate limit Syslog messages with severity level of 0 or 1. Severity level 0 or 1 messages may indicate catastrophic failures, while lower severity level messages use useful for accounting processes. In other embodiments, different rate limiting policies may be used.

In an embodiment, an event overflow store 110 is communicatively coupled to the event manager 106 on the device 102. Event overflow store 110 may be located within the device 102 or external to the device 102. For example, event overflow store 110 may comprise network storage, a network destination or a network server or service. Event overflow store 110 may comprise one or more overflow bucket data structures that are implemented in software. Event overflow store 110 may be coupled to event manager 106 indirectly through one or more networks that are collectively represented by cloud 105. Thus, the event overflow store 110 may comprise another network management system.

In an embodiment, event messages such as Syslog messages are sent from the event manager 106 to the overflow store 110 in the case of an event message backlog in the device 102, according to approaches herein. NMS 108 may retrieve event messages from the overflow store 110 over the network 104 via File Transfer Protocol (FTP) or other protocol.

In an embodiment, event manager 106 determines when a backlog of event messages is forming in a message queue 107 or other message buffer. When a backlog condition exists or is about to exist, the event manager 106 sends a backlog notification message to the NMS 108 signaling the onset of a backlog condition. In response to the backlog notification message, the NMS may take remedial action such as increasing a rate limit on the device 102. In an embodiment, NMS 108 increases a rate limit of device 102 by issuing a Command Line Interface (CLI) command to an Internetwork Operating System (IOS) software module.

At some point thereafter the backlog condition typically clears. Upon the clearing of the backlog condition, a backlog clear message is sent from the device 102 to the NMS 108. The backlog clear message indicates that the backlog condition has cleared. In response, the NMS 108 may reinstate the original rate limit or take other action. According to an embodiment, the clearing of the backlog may be detected by checking if the number of event messages in the queue 107 has fallen beyond a hysteresis threshold. For example, the hysteresis threshold may be lower than the threshold at which a backlog condition is declared. Using a lower hysteresis threshold avoids oscillating messages.

Alternatively, queue 107 may reach an overflow condition in which the queue is completely full but the event manager 106 continues to generate event messages. In an embodiment, when the event manager 106 determines that an overflow of event messages is imminent or occurring, the event manager 106 generates and sends an overflow message to the NMS 108 indicating that an overflow technique is being executed. In an embodiment, the overflow technique comprises the event manager 106 sending to the overflow store 110 all event messages generated after the transmission of the overflow message.

Once the message overflow situation clears, the event manager 106 sends an overflow clear message to the NMS 108 to indicate that the message overflow is cleared. The event manager 106 then resumes sending event messages normally. The event messages sent to the overflow store 110 may be retrieved at any time after the overflow situation is clear.

3.0 Method and Apparatus for Managing Event Message Backlogs

Figure 2A:
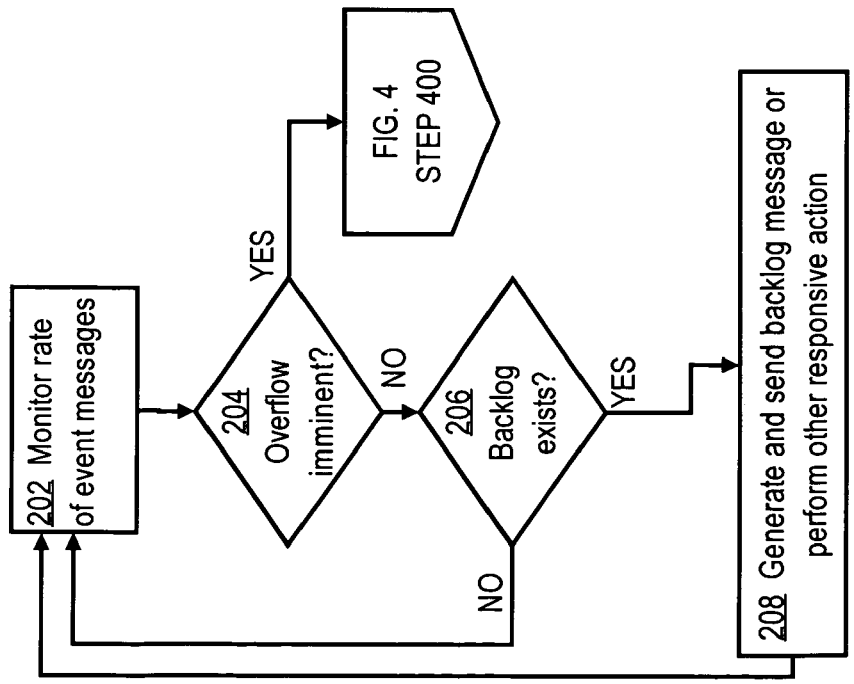
FIG. 2A illustrates an example of a message sender managing an event message backlog.

FIG. 2A illustrates an example of a message sender managing an event backlog. FIG. 2B illustrates an example of a message receiver managing an event message backlog. For purposes of illustrating a clear example, FIG. 2A-2B is described herein with reference to the network of FIG. 1. However, the broad approach of FIG. 2A-2B may be practiced with networks and arrangements other than shown in FIG. 1.

Referring now to FIG. 2A, in step 202, a rate of event messages is monitored. For example, event manager process 106 of a sending device 102 monitors message queue 107 to detect a backlog or overflow condition. In an embodiment, event manager process 106 monitors the rate of event messages that are generated compared to the rate at which the event messages are sent to event receiver process 112. If the rate of event message generation exceeds the rate of message transmission, then a message backlog may be created. The event manager process 106 detects the existence of a backlog or overflow via one or more techniques. One technique is to determine if the number of event messages in the message queue 107 exceeds a specified backlog threshold or a specified overload threshold, which may be configurable or hard-coded. The backlog threshold and overload threshold can be expressed as numbers of messages in the queue or buffer, percentages of the queue or buffer, amounts of time that are expected to be required to clear the backlog or overflow at the current rate of transmission with the current number of messages in the queue or buffer (e.g., 5 seconds), etc.

In step 204, a test determines whether a message overflow is imminent. For example, event manager process 106 determines whether a message overflow condition is imminent for message queue 107. The fact that an overflow condition exists, and messages are being redirected, can be notified using an event. If an overflow condition exists, then control passes to step 400 of FIG. 4, which is described further below. If no overflow is imminent, then control passes to step 206, which tests whether a message backlog exists in queue 107. For example, in step 206, event manager process 106 determines whether the backlog condition exists. If no backlog exists, then control passes to step 202 for continued monitoring.

If a backlog condition exists pursuant to one or more specified criteria, then in step 208 a backlog notification message is generated and sent, and then control passes to step 202 for continued monitoring. For example, event manager 106 sends the backlog notification message to the event receiver process 112 over network 104. The backlog notification message contains information that a backlog condition exists. In an embodiment, the backlog notification message is a Syslog message that contains information about the current size of the backlog, the number of the last event message currently in the message queue 107, etc.

A Syslog message is comprised of several parts, which may identify a severity of a condition that triggered the message, a header part with a timestamp of a time at which the message was generated, and a hostname or IP address of a sending device, and a message field. Typically the severity value is a digit between 0 and 7, with 0 representing a highest severity level and 7 representing a lowest severity level. Because the severity values are generated by the applications on which the triggering event is generated, there is generally no uniformity to what type of event will trigger which level of severity. Further, as mentioned above, since Syslog protocol is based upon UDP, it is unreliable and does not guarantee delivery of the messages. The messages may either be dropped through network congestion, or they may be maliciously intercepted and discarded.

In an embodiment, a backlog notification message has a high severity value. The severity value may be configurable, or adaptive. For example, the severity value of the backlog notification message corresponds to the highest severity of any of the messages in the queue, or the severity value is one unit higher than the highest severity value of any of the messages in the queue, or the severity value is the highest defined severity value ("0"). In an embodiment, device 102 can expedite certain event messages, and the backlog notification message is so expedited.

In an embodiment, when a backlog notification message has been sent, the backlog notification message is not sent again unless certain conditions exist. One example condition is that a backlog clear message also has been sent, but a backlog is building up again. Another example condition is that the backlog persists for a particular period of time, which may be configurable.

Referring now to FIG. 2B, in step 210, at some point the backlog notification message is received at a message receiver. For example, event receiver process 112 receives the backlog notification message. Upon receiving a backlog notification message, the receiving device, or a process executing on it, may take remedial action. For example, the receiving device or process may increase the rate limit at which messages may be sent from the sending device. Increasing the rate limit is appropriate when the device is not sending event messages faster due to the existence of a rate limiting condition rather than an inherent device limitation or network limitations.

In step 212, the receiving device determines whether to increase the rate limit on the sending device. If the rate limit is to be increased, control passes to step 218 in which the rate limit of the device is increased. Additionally or alternatively, the process of FIG. 3 may be used. If the test of step 212 is negative, then control returns at step 220.

In step 216, a test is made to determine whether a backlog clear message has been received. If a backlog clear message has been received, then the rate limit of the device is reduced at step 224.

If no backlog clear message has been received at step 216, then processing is complete at step 220 and control may return to step 210 or other monitoring may occur. If the clear message is not immediately received after increasing the rate limit, processing returns instead of waiting until a clear message arrives at a later time. However, eventually a backlog clear message may arrive (typically not immediately after the rate limit was increased, but after a certain time), in which case a rate limit that had been increased earlier should again be decreased.

The connection of step 218 to step 216 indicates that it is possible to reduce the rate limit again if the rate limit was increased earlier. Further, the relationship of steps 212, 216, 218, and 220 indicates that if the rate limit is increased, the receiver can subsequently wait until the backlog clear message is received and then reduce the rate limit again. If, on the other hand, the rate limit is not increased, then no special processing is needed even if the backlog clear message is received.

In an embodiment, increasing the rate limit of the sending device at step 218 is accomplished using a CLI command that is sent from the receiving device to the sending device. In another embodiment, increasing the rate limit of the sending device is accomplished using application server logic to request a temporary increase of any artificially imposed rate limit.

At step 218 the rate limit may be increased temporarily, which results in a sending device sending messages faster from the sending device. A temporary increase in message rate assists in working through the message backlog faster, decreasing the delay incurred until a message is actually transmitted and decreasing the likelihood that messages are dropped due to buffer overflow. The temporary increase may be undertaken based on factors such as whether the receiving device can handle the increased flow of messages in terms of overall load.

The receiving device can determine the amount by which to increase the rate limit in several ways. In an embodiment, the receiving device determines the maximum rate that the receiving device can handle over a specified period of time ("maximum rate"). A value for the specified period of time may be hard-coded into logic of the receiving device or may be configurable using a configuration file or configuration command.

In an embodiment, the receiving device also determines a rate that is likely to help the backlog ("target rate"). Determining the target rate may be performed using a heuristic calculation. For example, the current rate is increased by a specified configurable increase factor. The target rate is compared to the previously determined maximum rate, and the lower value is selected as the new rate limit and is transmitted to the sending device. In another embodiment, the rate limit may be removed for a period of time until the backlog condition clears. Removing the rate limit for a period of time may be appropriate when the rest of the network is quiet and the receiving device can handle the increased flow of messages.

At step 224, the current rate limit may be lowered back to its original value incrementally or at once.

The process of FIG. 2B may be repeated until the maximum rate is reached, or a backlog clear message is received.

Figure 3:
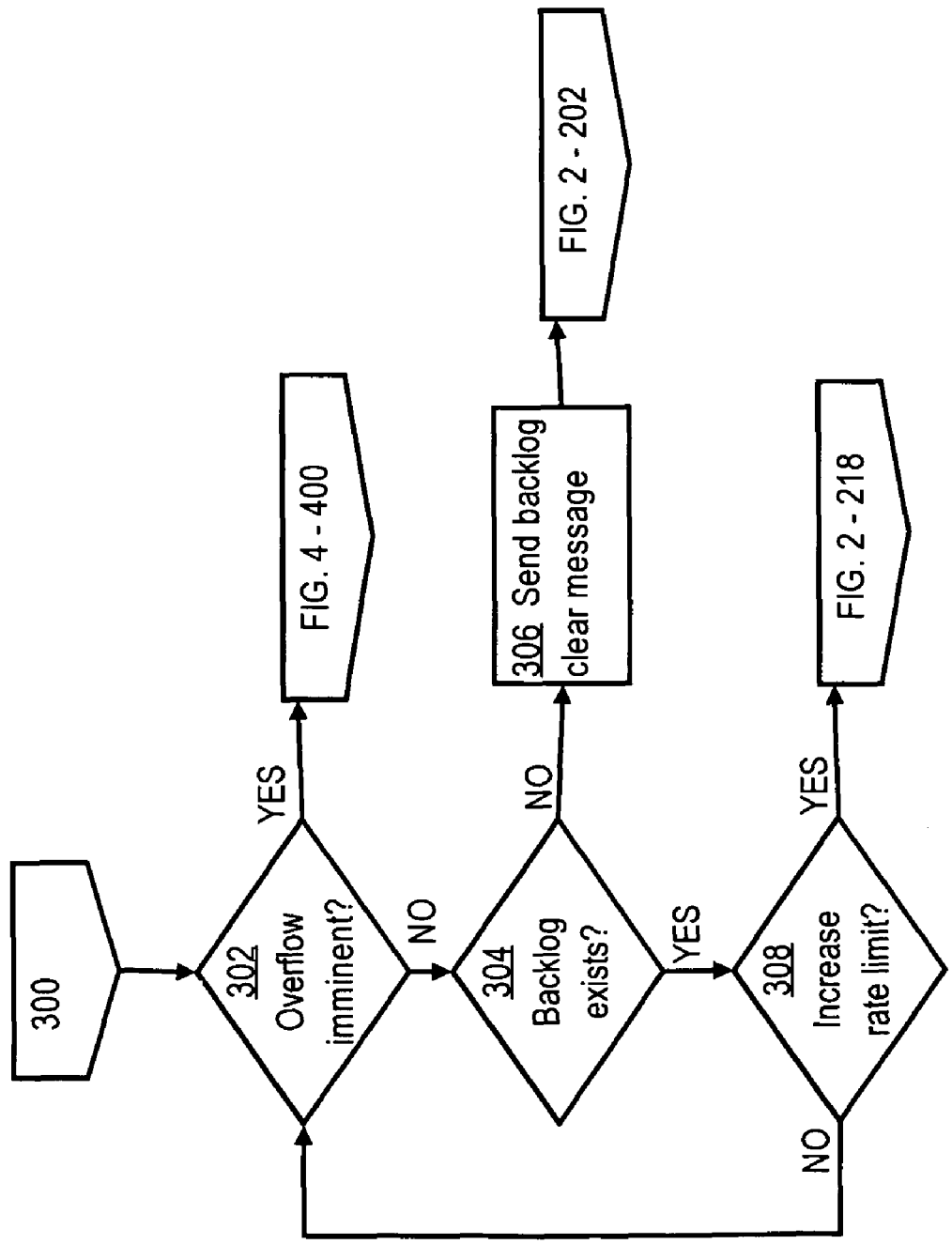
FIG. 3 illustrates further parts in an example of managing an event message backlog.

FIG. 3 illustrates further steps of managing an event message backlog.

Step 300 is reached when no rate limit has been imposed on the sending device or an increase in the limit is not feasible at the current time. In step 302, a sending device determines whether a message overflow condition is imminent. If so, control reverts to step 400 of FIG. 4.

If no message overflow condition is imminent, then control passes to step 304 in which the sending device determines whether the backlog condition still exists. If no backlog condition exists, then control passes to step 306 in which a backlog clear message is sent from the sending device to the receiving device. Control then passes to step 202 of FIG. 2.

If the backlog condition continues to exist at step 304, then a test at step 306 determines whether a rate limit increase is appropriate. If so, control passes to step 218 of FIG. 2 and a rate limit increase is performed as described above. If a rate limit increase is not desirable or feasible, then control reverts to step 302.

Figure 4:
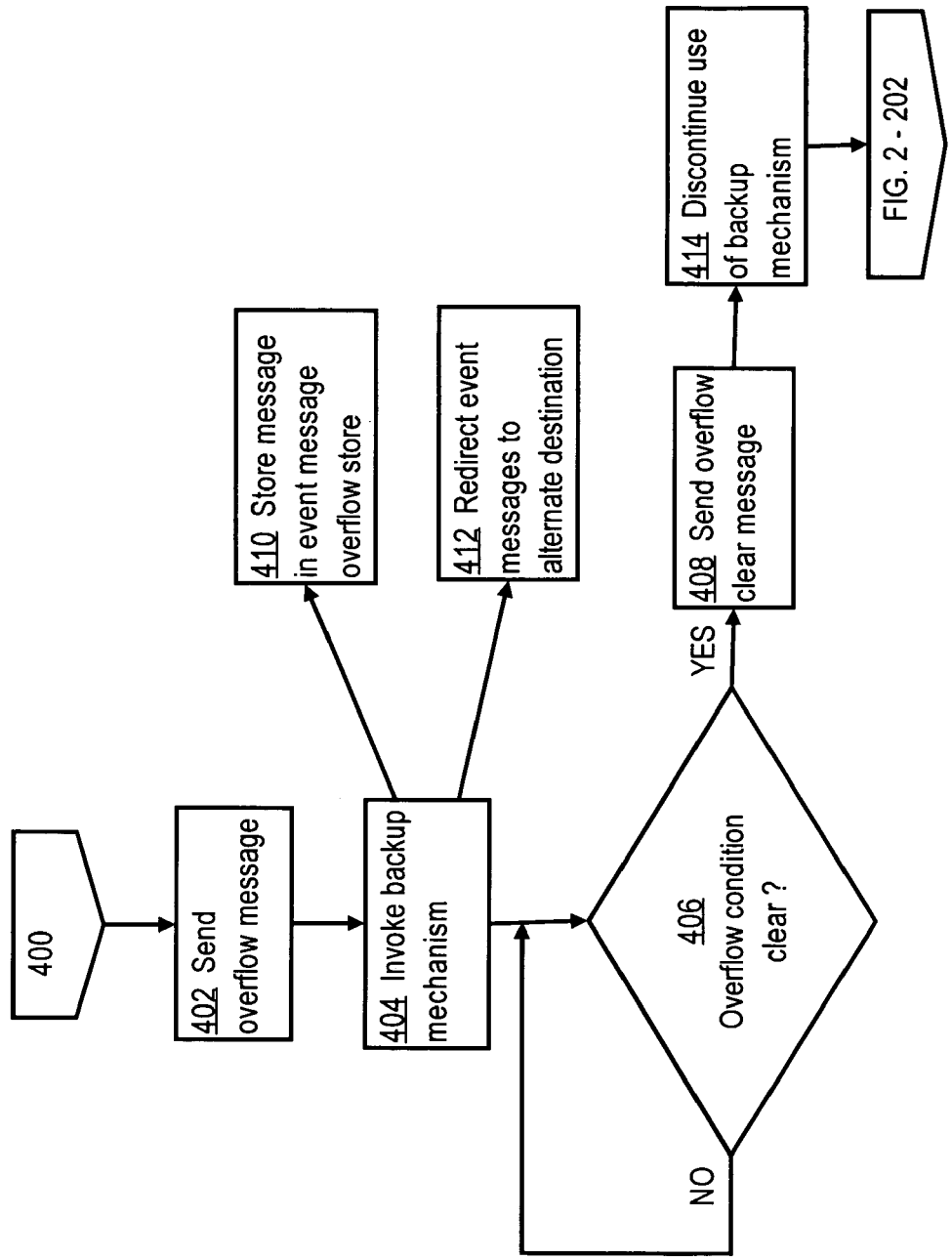
FIG. 4 illustrates further parts in an example of managing an event message backlog.

FIG. 4 illustrates further steps of managing an event message backlog. Step 400 is reached when an overflow condition exists or is imminent. In step 402, an overflow message is sent from the sending device to the receiving device. The overflow message is the last message to be placed in the regular message queue until the overflow condition is alleviated. In an embodiment, the overflow message also contains information specifying a backup mechanism.

In step 404, a message backup mechanism is invoked. In an embodiment, any event generated after the overflow message is sent is directed to either a preconfigured backup event mechanism (step 412) or stored in an event message overflow store (step 410). Step 410 may comprise event manager 106 storing all overflowing event messages in event message overflow store 110 of FIG. 1. In an embodiment, the event message overflow store 110 comprises a database on the sending device 102. In other embodiments, the event message overflow store may be a log file stored in the device, or any other data storage repository from which event messages may be retrieved at later points in processing.

Messages may be retrieved using FTP or another data transfer protocol. For example, after a backlog condition clears or after an overflow condition clears, the event receiver process 112 of network management station 108 may initiate an FTP transfer of overflow messages from event message overflow store 110 to the event receiver process. As a result, the NMS 108 recovers messages that otherwise would have been lost due to the backlog or overflow. The NMS may initiate such a transfer in response to receiving a backlog clear message at step 306 of FIG. 3.

In an embodiment, a backup event mechanism as used at step 412 may comprise a module that redirects event messages to a different event channel, or over a different connection or to a different destination. In such an embodiment, event messages are continuously available, unlike prior approaches in which messages generated during an overflow condition are dropped and are not later recoverable.

A configuration file or configuration command may indicate the specific location of an event message overflow store 110 or a backup event mechanism as used at step 412. Thus, local storage is not required and network storage or network mechanisms may be used. In an embodiment that uses products from Cisco Systems, Inc., San Jose, Calif., the backup event mechanism and event message overflow store 110 may be implemented as part of an event logger queue in a Syslog event manager in Cisco IOS® Software.

According to an embodiment, the backup mechanism used at step 412 is implemented at the device 102 as part of a message queue and log process. In one embodiment, a process places messages in a processing queue wherein the message is formatted; for example, a timestamp may be placed on the message indicating when the message was diverted. The processing queue formats the message and places the message in a send queue wherein the top message is popped off at regular intervals. According to an embodiment, a special Syslog event session is invoked on the sending device that takes the overflowing messages popped off the queue and diverts them to the appropriate backup mechanism or event message store.

A test at step 406 determines whether the overflow condition is clear. If the overflow condition is clear, then in step 408 an overflow clear message is sent from the sending device to the receiving device, and control then reverts to step 202 of FIG. 2. If the overflow condition still exists, event messages continue to be diverted over the preconfigured backup event mechanism or to the event message store.

A policy, under which a message overflow situation is declared to be clear, may be configurable. For example, a policy specifies that a message overflow situation is clear only when the message queue 107 is empty. While such a policy will indicate a clearing of the overflow condition, events may still be generated at a fast pace so that the queue 107 immediately fills, causing another backlog and causing the processes of FIG. 2, FIG. 3, FIG. 4 to repeat.

A second example policy is to check whether the message queue 107 is empty and if the rate of current event generation is less than or equal to regular event message bandwidth. Detecting such a rate may occur by comparing the sustainable event message rate and the number of event messages that were directed to the overflow mechanism over a predetermined time interval.

In an embodiment, if the overflow mechanism used at step 412 also overflows, then the techniques herein may be applied recursively to prevent loss of messages that have been redirected to the overflow mechanism.

In another embodiment, device 102 may manage multiple event message overflow stores 110. For example, device 102 may have a set of cascading stores 110, in which a first overflow store is used and a second or successive overflow store is used if the first overflow store fills.

Embodiments may provide pro-active monitoring of event queues and message buffers to detect backlog and overflow before conditions become catastrophic or result in message loss. Embodiments provide adaptive rate limiting of message generation. Embodiments may provide one or more overflow buckets for storing event messages without loss during backlog conditions or overflow conditions. As a result, the communication of events from a network device to a network management system is made more reliable and latency of event message delivery is reduced.

4.0 Implementation Mechanisms—Hardware Overview

Figure 5:
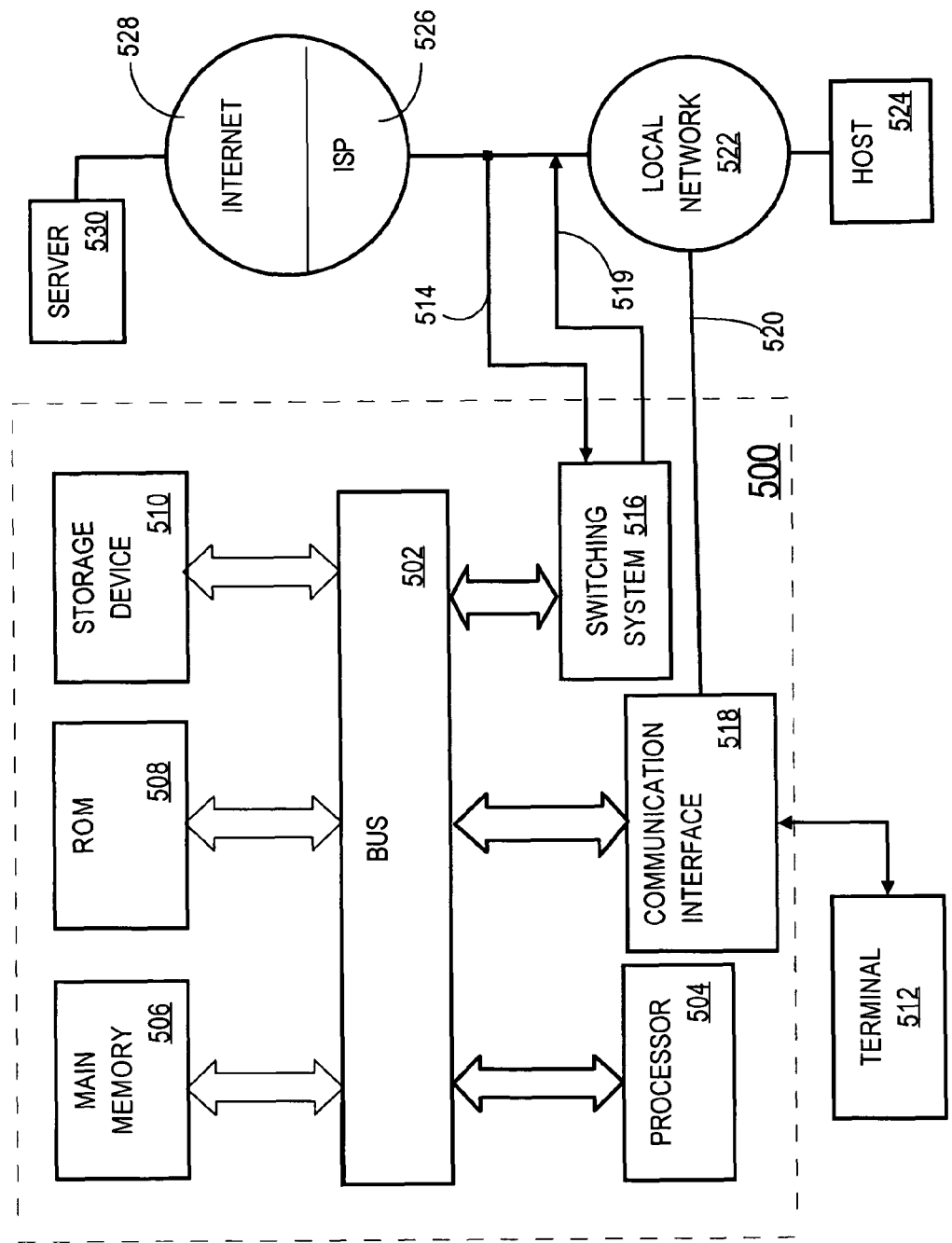
FIG. 5 illustrates a computer system on which an example method may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for event processing in rate limited network devices. According to one embodiment of the invention, event processing in rate limited network devices is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for event processing in rate limited network devices as described herein.

The received code may be executed by processor 504 as it is received, and/or stored in storage device 510, or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Any application or feature herein requiring protocol information or protocol flags can use the information extracted from the IPv6 header and mandatory examination next headers, and that this protocol information may represent any appropriate protocol including but not restricted to TCP, UDP and ICMP.

What is claimed is:

1. An apparatus comprising:
    a network interface that is coupled to a data network for receiving one or more packet flows therefrom;
    a processor;
    logic coupled to the processor and which, when executed by the processor, causes the processor to perform:
        detecting a backlog of event messages in a first network device, wherein the backlog comprises an accumulation of messages, in the first network device, that have not been transmitted from the first network device to a second network device;
        in response to detecting the backlog on the first network device, generating a backlog notification message in the first network device and sending the backlog notification message from the first network device to the second network device; and
        receiving, at the first network device, a request from the second network device to increase an event message rate limit for transmitting the messages by the first network device to the second network device.

2. The apparatus of claim 1, further comprising logic which, when executed, causes the processor to perform:
    detecting an overflow of the event messages in the first network device;
    in response to detecting the overflow of the event messages:
    generating an overflow notification message in the first network device and sending the overflow notification message to the second network device;
    storing all subsequent event messages generated at the first network device in an event message overflow store without sending the subsequent event messages;
    detecting that the overflow has ceased, and in response to detecting that the overflow has ceased, resuming sending event messages to the second network device.

3. The apparatus of claim 2, further comprising logic that is configured to cause, in response to detecting that the overflow on the first network device no longer exists, the second network device to retrieve the stored event messages.

4. The apparatus of claim 1, further comprising a Syslog process hosted in the first network device, and wherein the logic is configured to generate the event messages by the Syslog process.

5. The apparatus of claim 1, further comprising logic which, when executed, causes the processor to perform detecting that the backlog has ceased; in response to detecting that the backlog has ceased, generating a backlog clear message at the first network device and sending the backlog clear message to the second network device.

6. The apparatus of claim 2, further comprising logic which, when executed, causes the processor to perform detecting that the overflow on the first network device no longer exists, generating an overflow clear message at the first network device and sending the overflow clear message to the second network device.

7. The apparatus of claim 1, wherein the second network device is a network management system.

8. The apparatus of claim 1, further comprising logic which, when executed, causes the processor to perform receiving, from the second network device, a command line interface command that specifies an increase in a rate limit associated with the first network device.

9. A method, comprising:
   detecting a backlog of event messages in a first network device, wherein the backlog comprises an accumulation of messages, in the first network device, that have not been transmitted from the first network device to a second network device;
   in response to detecting the backlog on the first network device, generating a backlog notification message in the first network device and sending the backlog notification message from the first network device to the second network device; and
   receiving, at the first network device, a request from the second network device to increase an event message rate limit for transmitting the messages by the first network device to the second network device;
   wherein the method is performed by one or more processors.

10. The method of claim 9, further comprising:
    detecting an overflow of the event messages in the first network device;
    in response to detecting the overflow of the event messages:
    generating an overflow notification message in the first network device and sending the overflow notification message to the second network device;
    storing all subsequent event messages generated at the first network device in an event message overflow store without sending the subsequent event messages;
    detecting that the overflow has ceased, and in response to detecting that the overflow has ceased, resuming sending event messages to the second network device.

11. The method of claim 10, further comprising causing the second network device to retrieve the stored event messages in response to detecting that the overflow on the first network device no longer exists.

12. The method of claim 9, further comprising generating the event messages using a Syslog process hosted in the first network device.

13. The method of claim 9, further comprising detecting that the backlog has ceased; in response to detecting that the backlog has ceased, generating a backlog clear message at the first network device and sending the backlog clear message to the second network device.

14. The method of claim 10, further comprising detecting that the overflow on the first network device no longer exists, generating an overflow clear message at the first network device and sending the overflow clear message to the second network device.

15. The method of claim 9, wherein sending the backlog notification message to the second network device comprises sending the backlog notification message to a network management system.

16. The method of claim 9, further comprising receiving, from the second network device, a command line interface command that specifies an increase in a rate limit associated with the first network device.

17. An apparatus comprising:
    a network interface that is coupled to a data network for receiving one or more packet flows therefrom;
    a processor;
    means for detecting a backlog of event messages in a first network device, wherein the backlog comprises an accumulation of messages, in the first network device, that have not been transmitted from the first network device to a second network device;
    means for generating a backlog notification message in the first network device and sending the backlog notification message from the first network device to the second network device, in response to detecting the backlog on the first network device; and
    means for receiving, at the first network device, a request from the second network device to increase an event message rate limit for transmitting the messages by the first network device to the second network device.

18. A network management system comprising:
    a networking device comprising a network interface capable of receiving one or more packet flows, and a processor;
    a network management system coupled to the networking device;
    logic in the networking device which when executed by the processor causes detecting a backlog of event messages in the networking device, wherein the backlog comprises an accumulation of messages that have not been transmitted from the networking device to the network management system;
    logic in the networking device which when executed by the processor causes generating a backlog notification message in the networking device and sending the backlog notification message from the networking device to the network management system, in response to detecting the backlog on the networking device; and
    logic in the networking device which when executed by the processor causes receiving, at the network device, a request from the network management system to increase an event message rate limit for transmitting the messages by the networking device to the network management system.

19. The system of claim 18, the networking device further comprising logic which, when executed, causes the processor to perform:
    detecting an overflow of the event messages in the networking device;
    in response to detecting the overflow of the event messages:
    generating an overflow notification message in the networking device and sending the overflow notification message to the network management system;
    storing all subsequent event messages generated at the networking device in an event message overflow store without sending the subsequent event messages;
    detecting that the overflow has ceased, and in response to detecting that the overflow has ceased, resuming sending event messages to the network management system.

20. The system of claim 19, wherein the network management system further comprises logic which, when executed, causes the network management system to retrieve the stored event messages.

21. The apparatus of claim 17, further comprising:
    means for detecting an overflow of the event messages in the first network device;
    in response to detecting the overflow of the event messages:
    means for generating an overflow notification message in the first network device and sending the overflow notification message to the second network device;
    means for storing all subsequent event messages generated at the first network device in an event message overflow store without sending the subsequent event messages;
    means for detecting that the overflow has ceased, and in response to detecting that the overflow has ceased, resuming sending event messages to the second network device.

22. The apparatus of claim 17, further comprising a Syslog process hosted in the first network device, and wherein logic coupled to the processor is configured to generate the event messages by the Syslog process.

23. The apparatus of claim 17, further comprising means for detecting that the backlog has ceased; in response to detecting that the backlog has ceased, means for generating a backlog clear message at the first network device and sending the backlog clear message to the second network device.

24. The apparatus of claim 17, wherein the second network device is a network management system.

25. The apparatus of claim 17, further comprising means for receiving, from the second network device, a command line interface command that specifies an increase in a rate limit associated with the first network device.

* * * * *